(12) United States Patent
Paolini, Jr. et al.

(10) Patent No.: US 10,388,233 B2
(45) Date of Patent: Aug. 20, 2019

(54) DEVICES AND TECHNIQUES FOR ELECTRONICALLY ERASING A DRAWING DEVICE

(71) Applicant: E Ink Corporation, Billerica, MA (US)

(72) Inventors: Richard J. Paolini, Jr., Framingham, MA (US); Stephen J. Telfer, Arlington, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 15/252,569

(22) Filed: Aug. 31, 2016

(65) Prior Publication Data

US 2017/0061895 A1    Mar. 2, 2017

Related U.S. Application Data

(60) Provisional application No. 62/212,469, filed on Aug. 31, 2015.

(51) Int. Cl.
*G09G 3/34*        (2006.01)
*G02F 1/167*     (2019.01)
(Continued)

(52) U.S. Cl.
CPC .............. *G09G 3/344* (2013.01); *G02F 1/167* (2013.01); *G02F 1/1676* (2019.01); *G06F 3/0354* (2013.01); *G06F 3/03545* (2013.01); *G09G 2310/0245* (2013.01); *G09G 2330/028* (2013.01); *G09G 2354/00* (2013.01)

(58) Field of Classification Search
None
See application file for complete search history.

(56) References Cited

U.S. PATENT DOCUMENTS

| 4,418,346 A | 11/1983 | Batchelder |
| 5,760,761 A | 6/1998 | Sheridon |

(Continued)

FOREIGN PATENT DOCUMENTS

| JP | 2008186009 A | 8/2008 |
| JP | 2010002499 A | 1/2010 |

(Continued)

OTHER PUBLICATIONS

Wood, D., "An Electrochromic Renaissance?" Information Display, 18(3), 24 (Mar. 2002) Mar. 1, 2002.

(Continued)

*Primary Examiner* — Christopher J Kohlman
(74) *Attorney, Agent, or Firm* — Brian Bean

(57) ABSTRACT

Devices and techniques for electronically erasing an externally addressed electrophoretic drawing device are described. An electronically-erasable drawing device comprises an electro-optic display medium and interdigitated electrodes disposed adjacent one surface of the medium and configured to drive the medium to an intermediate (gray) optical state. A mobile electronic drawing implement may include electrodes configured to apply a fringing electric field to an electro-optic display medium from one side of the medium, the fringing electric field being arranged to drive a portion of the display medium adjacent the implement to an intermediate optical state, the electrodes being movable relative to the medium.

16 Claims, 7 Drawing Sheets

(51) Int. Cl.
*G06F 3/0354* (2013.01)
*G02F 1/1676* (2019.01)

(56) References Cited

U.S. PATENT DOCUMENTS

| | | | |
|---|---|---|---|
| 5,777,782 A | 7/1998 | Sheridon | |
| 5,808,783 A | 9/1998 | Crowley | |
| 5,872,552 A | 2/1999 | Gordon, II | |
| 5,930,026 A | 7/1999 | Jacobson | |
| 6,054,071 A | 4/2000 | Mikkelsen, Jr. | |
| 6,055,091 A | 4/2000 | Sheridon | |
| 6,097,531 A | 8/2000 | Sheridon | |
| 6,128,124 A | 10/2000 | Silverman | |
| 6,130,774 A | 10/2000 | Albert | |
| 6,137,467 A | 10/2000 | Sheridon | |
| 6,144,361 A | 11/2000 | Gordon, II | |
| 6,147,791 A | 11/2000 | Sheridon | |
| 6,172,798 B1 | 1/2001 | Albert | |
| 6,184,856 B1 | 2/2001 | Gordon, II | |
| 6,225,971 B1 | 5/2001 | Gordon, II | |
| 6,241,921 B1 | 6/2001 | Jacobson | |
| 6,271,823 B1 | 8/2001 | Gordon, II | |
| 6,301,038 B1 | 10/2001 | Fitzmaurice | |
| 6,445,489 B1 | 9/2002 | Jacobson et al. | |
| 6,473,072 B1 * | 10/2002 | Comiskey | B41J 3/4076 345/107 |
| 6,504,524 B1 | 1/2003 | Gates | |
| 6,512,354 B2 | 1/2003 | Jacobson | |
| 6,531,997 B1 | 3/2003 | Gates | |
| 6,727,882 B1 | 4/2004 | Large | |
| 6,738,050 B2 | 5/2004 | Comiskey | |
| 6,753,999 B2 | 6/2004 | Zehner | |
| 6,816,146 B2 | 11/2004 | Harada | |
| 6,825,970 B2 | 11/2004 | Goenaga | |
| 6,831,771 B2 | 12/2004 | Ho | |
| 6,865,010 B2 | 3/2005 | Duthaler et al. | |
| 6,866,760 B2 | 3/2005 | Paolini, Jr. | |
| 6,870,657 B1 | 3/2005 | Fitzmaurice | |
| 6,900,851 B2 | 5/2005 | Morrison et al. | |
| 6,922,276 B2 | 7/2005 | Zhang et al. | |
| 6,950,220 B2 | 9/2005 | Abramson et al. | |
| 6,970,154 B2 | 11/2005 | Sheridon | |
| 6,982,178 B2 | 1/2006 | LeCain et al. | |
| 6,995,550 B2 | 2/2006 | Jacobson | |
| 7,002,728 B2 | 2/2006 | Pullen et al. | |
| 7,012,600 B2 | 3/2006 | Zehner | |
| 7,023,420 B2 | 4/2006 | Comiskey et al. | |
| 7,034,783 B2 | 4/2006 | Gates | |
| 7,061,166 B2 | 6/2006 | Kuniyasu | |
| 7,061,662 B2 | 6/2006 | Chung | |
| 7,072,095 B2 | 7/2006 | Liang | |
| 7,075,502 B1 | 7/2006 | Drzaic | |
| 7,116,318 B2 | 10/2006 | Amundson et al. | |
| 7,116,466 B2 | 10/2006 | Whitesides et al. | |
| 7,119,772 B2 | 10/2006 | Amundson | |
| 7,142,350 B2 | 11/2006 | May et al. | |
| 7,144,942 B2 | 12/2006 | Zang | |
| 7,167,155 B1 | 1/2007 | Albert et al. | |
| 7,170,670 B2 | 1/2007 | Webber | |
| 7,177,066 B2 | 2/2007 | Chung | |
| 7,193,625 B2 | 3/2007 | Danner et al. | |
| 7,202,847 B2 | 4/2007 | Gates | |
| 7,236,291 B2 | 6/2007 | Kaga et al. | |
| 7,242,514 B2 | 7/2007 | Chung | |
| 7,259,744 B2 | 8/2007 | Arango | |
| 7,304,787 B2 | 12/2007 | Whitesides et al. | |
| 7,312,784 B2 | 12/2007 | Baucom et al. | |
| 7,312,794 B2 | 12/2007 | Zehner | |
| 7,321,459 B2 | 1/2008 | Masuda et al. | |
| 7,327,511 B2 | 2/2008 | Whitesides et al. | |
| 7,339,715 B2 | 3/2008 | Webber et al. | |
| 7,408,699 B2 | 8/2008 | Wang | |
| 7,411,719 B2 | 8/2008 | Paolini, Jr. et al. | |
| 7,420,549 B2 | 9/2008 | Jacobson | |
| 7,453,445 B2 | 11/2008 | Amundson | |
| 7,492,339 B2 | 2/2009 | Amundson | |
| 7,528,822 B2 | 5/2009 | Amundson | |
| 7,535,624 B2 | 5/2009 | Amundson et al. | |
| 7,545,358 B2 | 6/2009 | Gates et al. | |
| 7,583,251 B2 | 9/2009 | Arango | |
| 7,602,374 B2 | 10/2009 | Zehner et al. | |
| 7,612,760 B2 | 11/2009 | Kawai | |
| 7,615,325 B2 | 11/2009 | Liang | |
| 7,679,599 B2 | 3/2010 | Kawai | |
| 7,679,813 B2 | 3/2010 | Liang | |
| 7,683,606 B2 | 3/2010 | Kang | |
| 7,688,297 B2 | 3/2010 | Zehner et al. | |
| 7,715,088 B2 | 5/2010 | Liang | |
| 7,729,039 B2 | 6/2010 | LeCain et al. | |
| 7,733,311 B2 | 6/2010 | Amundson | |
| 7,733,335 B2 | 6/2010 | Zehner et al. | |
| 7,787,169 B2 | 8/2010 | Abramson et al. | |
| 7,839,564 B2 | 11/2010 | Whitesides et al. | |
| 7,848,006 B2 | 12/2010 | Wilcox | |
| 7,859,742 B1 | 12/2010 | Chiu | |
| 7,952,557 B2 | 5/2011 | Amundson et al. | |
| 7,956,841 B2 | 6/2011 | Albert | |
| 7,982,479 B2 | 7/2011 | Wang | |
| 7,999,787 B2 | 8/2011 | Amundson | |
| 8,009,348 B2 | 8/2011 | Zehner | |
| 8,077,141 B2 | 12/2011 | Duthaler | |
| 8,125,501 B2 | 2/2012 | Amundson | |
| 8,139,050 B2 | 3/2012 | Jacobson et al. | |
| 8,174,490 B2 | 5/2012 | Whitesides | |
| 8,243,013 B2 | 8/2012 | Sprague | |
| 8,274,472 B1 | 9/2012 | Wang | |
| 8,289,250 B2 | 10/2012 | Zehner | |
| 8,300,006 B2 | 10/2012 | Zhou | |
| 8,305,341 B2 | 11/2012 | Arango | |
| 8,314,784 B2 | 11/2012 | Ohkami | |
| 8,373,649 B2 | 2/2013 | Low | |
| 8,384,658 B2 | 2/2013 | Albert | |
| 8,456,414 B2 | 6/2013 | Lin | |
| 8,462,102 B2 | 6/2013 | Wong | |
| 8,514,168 B2 | 8/2013 | Chung | |
| 8,537,105 B2 | 9/2013 | Chiu | |
| 8,558,783 B2 | 10/2013 | Wilcox | |
| 8,558,785 B2 | 10/2013 | Zehner | |
| 8,558,786 B2 | 10/2013 | Lin | |
| 8,558,855 B2 | 10/2013 | Sprague | |
| 8,576,164 B2 | 11/2013 | Sprague | |
| 8,576,259 B2 | 11/2013 | Lin | |
| 8,593,396 B2 | 11/2013 | Amundson | |
| 8,605,032 B2 | 12/2013 | Liu | |
| 8,610,694 B2 | 12/2013 | Ogawa | |
| 8,643,595 B2 | 2/2014 | Chung | |
| 8,665,206 B2 | 3/2014 | Lin | |
| 8,681,191 B2 | 3/2014 | Yang | |
| 8,717,664 B2 | 5/2014 | Wang | |
| 8,730,153 B2 | 5/2014 | Sprague | |
| 8,810,525 B2 | 8/2014 | Sprague | |
| 8,928,562 B2 | 1/2015 | Gates et al. | |
| 8,928,635 B2 | 1/2015 | Harley | |
| 8,928,641 B2 | 1/2015 | Chiu | |
| 8,976,444 B2 | 3/2015 | Zhang | |
| 9,013,394 B2 | 4/2015 | Lin | |
| 9,019,197 B2 | 4/2015 | Lin | |
| 9,019,198 B2 | 4/2015 | Lin | |
| 9,019,318 B2 | 4/2015 | Sprague | |
| 9,082,352 B2 | 7/2015 | Cheng | |
| 9,171,508 B2 | 10/2015 | Sprague | |
| 9,218,773 B2 | 12/2015 | Sun | |
| 9,224,338 B2 | 12/2015 | Chan | |
| 9,224,342 B2 | 12/2015 | Lin | |
| 9,224,344 B2 | 12/2015 | Chung | |
| 9,230,492 B2 | 1/2016 | Harrington | |
| 9,251,736 B2 | 2/2016 | Lin | |
| 9,262,973 B2 | 2/2016 | Wu | |
| 9,269,311 B2 | 2/2016 | Amundson | |
| 9,279,906 B2 | 3/2016 | Kang | |
| 9,299,294 B2 | 3/2016 | Lin | |
| 9,373,289 B2 | 6/2016 | Sprague | |
| 9,390,066 B2 | 7/2016 | Smith | |
| 9,390,661 B2 | 7/2016 | Chiu | |

(56) References Cited

U.S. PATENT DOCUMENTS

| | | |
|---|---|---|
| 9,412,314 B2 | 8/2016 | Amundson |
| 9,697,778 B2 | 7/2017 | Telfer |
| 2002/0180688 A1* | 12/2002 | Drzaic ............... B41J 3/4076 345/107 |
| 2003/0102858 A1 | 6/2003 | Jacobson et al. |
| 2004/0041799 A1 | 3/2004 | Vincent |
| 2004/0246562 A1 | 12/2004 | Chung |
| 2005/0253777 A1 | 11/2005 | Zehner et al. |
| 2007/0091418 A1 | 4/2007 | Danner et al. |
| 2007/0103427 A1 | 5/2007 | Zhou |
| 2007/0164983 A1* | 7/2007 | Hamaguchi ....... G02F 1/134363 345/107 |
| 2007/0176912 A1 | 8/2007 | Beames |
| 2008/0024429 A1 | 1/2008 | Zehner |
| 2008/0024482 A1 | 1/2008 | Gates |
| 2008/0136774 A1 | 6/2008 | Harris |
| 2008/0291129 A1 | 11/2008 | Harris |
| 2008/0303780 A1 | 12/2008 | Sprague |
| 2009/0174651 A1 | 7/2009 | Jacobson |
| 2009/0195568 A1 | 8/2009 | Sjodin |
| 2009/0322721 A1 | 12/2009 | Zehner |
| 2010/0079436 A1* | 4/2010 | Komatsu ............ G09G 3/344 345/211 |
| 2010/0194733 A1 | 8/2010 | Lin |
| 2010/0194789 A1 | 8/2010 | Lin |
| 2010/0220121 A1 | 9/2010 | Zehner |
| 2010/0265561 A1 | 10/2010 | Gates et al. |
| 2010/0283804 A1 | 11/2010 | Sprague |
| 2011/0063314 A1 | 3/2011 | Chiu |
| 2011/0175875 A1 | 7/2011 | Lin |
| 2011/0193840 A1 | 8/2011 | Amundson |
| 2011/0193841 A1 | 8/2011 | Amundson |
| 2011/0199671 A1 | 8/2011 | Amundson |
| 2011/0221740 A1 | 9/2011 | Yang |
| 2012/0001957 A1 | 1/2012 | Liu |
| 2012/0098740 A1 | 4/2012 | Chiu |
| 2013/0057942 A1* | 3/2013 | Wang ................. G02F 1/167 359/296 |
| 2013/0063333 A1 | 3/2013 | Arango |
| 2013/0194250 A1 | 8/2013 | Amundson |
| 2013/0249782 A1 | 9/2013 | Wu |
| 2013/0321278 A1 | 12/2013 | Sjodin et al. |
| 2014/0009817 A1 | 1/2014 | Wilcox et al. |
| 2014/0085355 A1 | 3/2014 | Chang |
| 2014/0204012 A1 | 7/2014 | Wu |
| 2014/0218277 A1 | 8/2014 | Cheng |
| 2014/0240210 A1 | 8/2014 | Wu |
| 2014/0240373 A1 | 8/2014 | Harrington |
| 2014/0253425 A1 | 9/2014 | Zalesky |
| 2014/0292830 A1 | 10/2014 | Harrington et al. |
| 2014/0293398 A1 | 10/2014 | Wang |
| 2014/0333685 A1 | 11/2014 | Sim |
| 2014/0340734 A1 | 11/2014 | Lin |
| 2015/0005720 A1 | 1/2015 | Zang |
| 2015/0070744 A1 | 3/2015 | Danner et al. |
| 2015/0097877 A1 | 4/2015 | Lin |
| 2015/0109283 A1 | 4/2015 | Gates |
| 2015/0213749 A1 | 7/2015 | Lin |
| 2015/0213765 A1 | 7/2015 | Gates |
| 2015/0221257 A1 | 8/2015 | Wilcox et al. |
| 2015/0262255 A1 | 9/2015 | Khajehnouri |
| 2015/0277160 A1 | 10/2015 | Laxton |
| 2016/0012710 A1 | 1/2016 | Lu |
| 2016/0071465 A1 | 3/2016 | Hung |
| 2016/0078820 A1 | 3/2016 | Harrington |
| 2016/0093253 A1 | 3/2016 | Yang |
| 2016/0140910 A1 | 5/2016 | Amundson |
| 2016/0180777 A1 | 6/2016 | Lin |

FOREIGN PATENT DOCUMENTS

| | | |
|---|---|---|
| JP | 2011224417 A | 11/2011 |
| WO | 1999010767 A1 | 3/1999 |

OTHER PUBLICATIONS

O'Regan, B. et al., "A Low Cost, High-efficiency Solar Cell Based on Dye-sensitized colloidal TiO2 Films", Nature, vol. 353, Oct. 24, 1991, 737-740 Oct. 24, 1991.

Bach, U., et al., "Nanomaterials-Based Electrochromics for Paper-Quality Displays", Adv. Mater, 14(11), 845 (2002) Jun. 5, 2002.

Hayes, R.A., et al., "Video-Speed Electronic Paper Based on Electrowetting", Nature, vol. 425, Sep. 25, pp. 383-385 (2003) Sep. 25, 2003.

Kitamura, T., et al., "Electrical toner movement for electronic paper-like display", Asia Display/IDW '01, p. 1517, Paper HCS1-1 (2001) Jan. 1, 2001.

Yamaguchi, Y., et al., "Toner display using insulative particles charged triboelectrically", Asia Display/IDW '01, p. 1729, Paper AMD4-4 (2001) Jan. 1, 2001.

Korean Intellectual Property Office; PCT/US2016/049626; International Search Report and Written Opinion; dated Dec. 7, 2016. Dec. 7, 2016.

European Patent Office, EP Application No. 16842870.4, Extended European Search Report, dated May 28, 2018.

\* cited by examiner

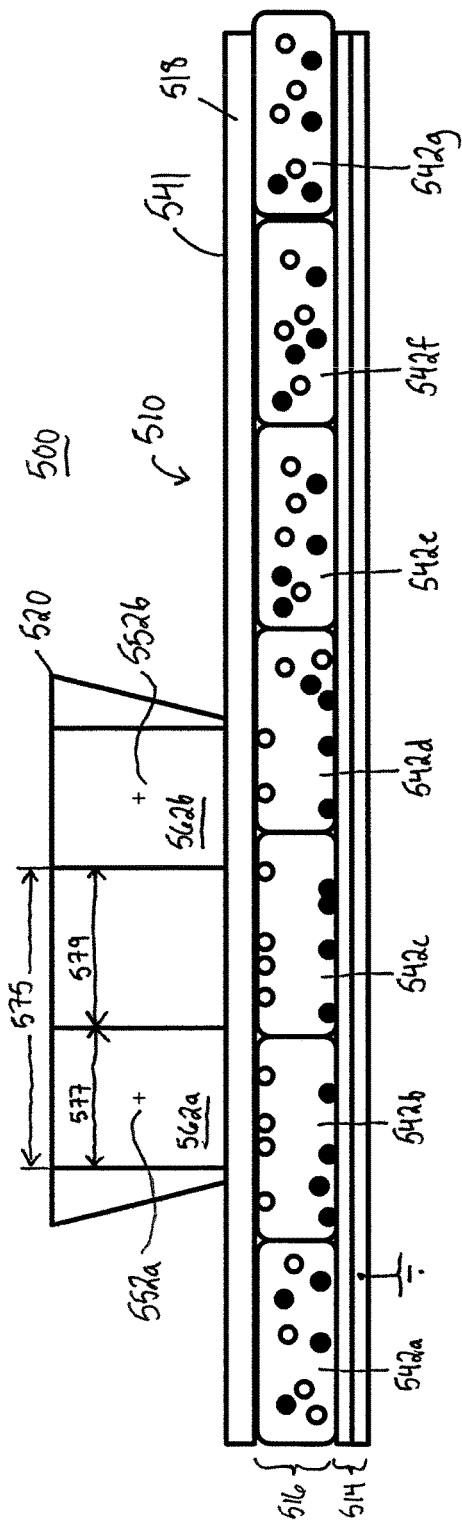

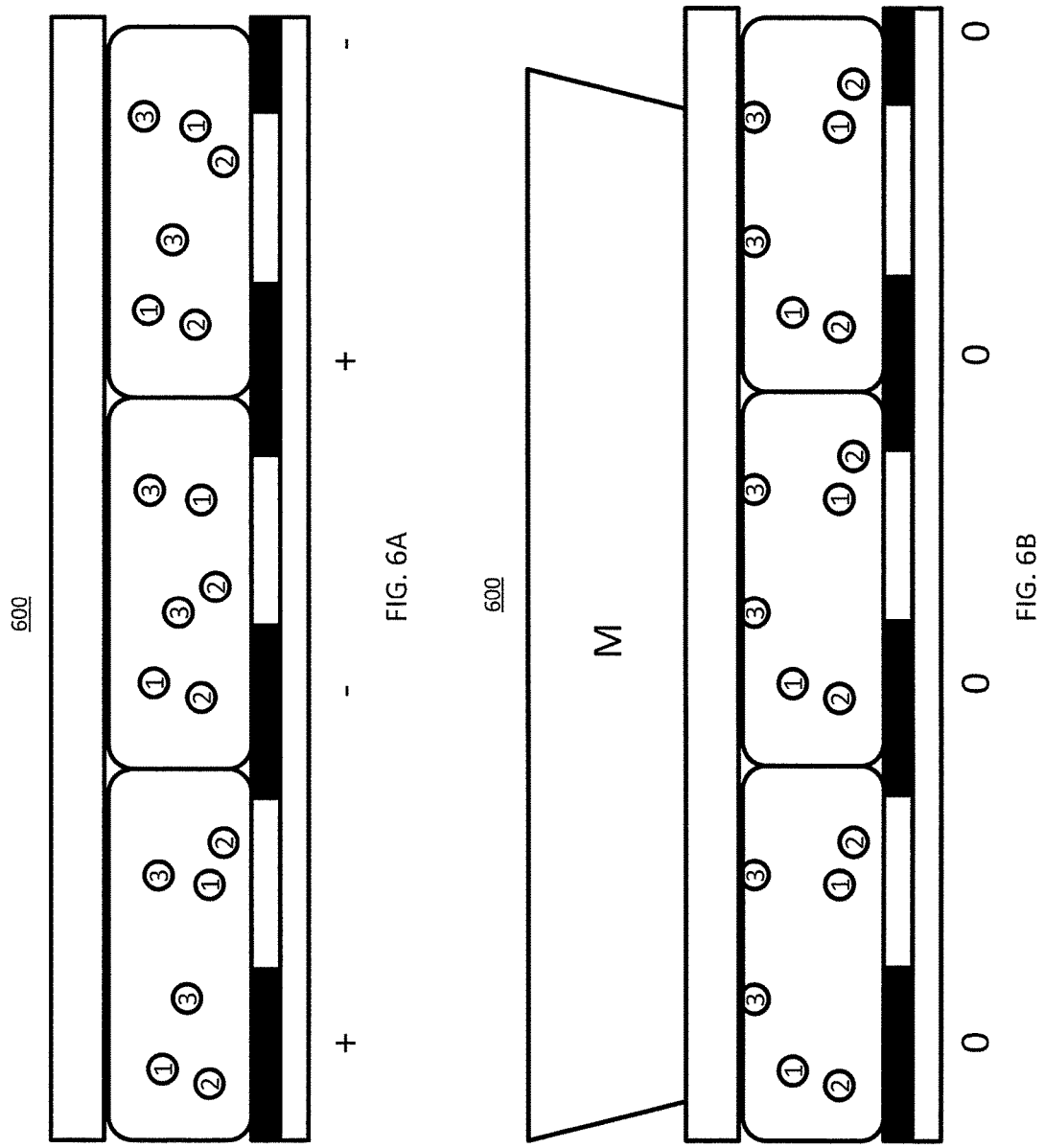

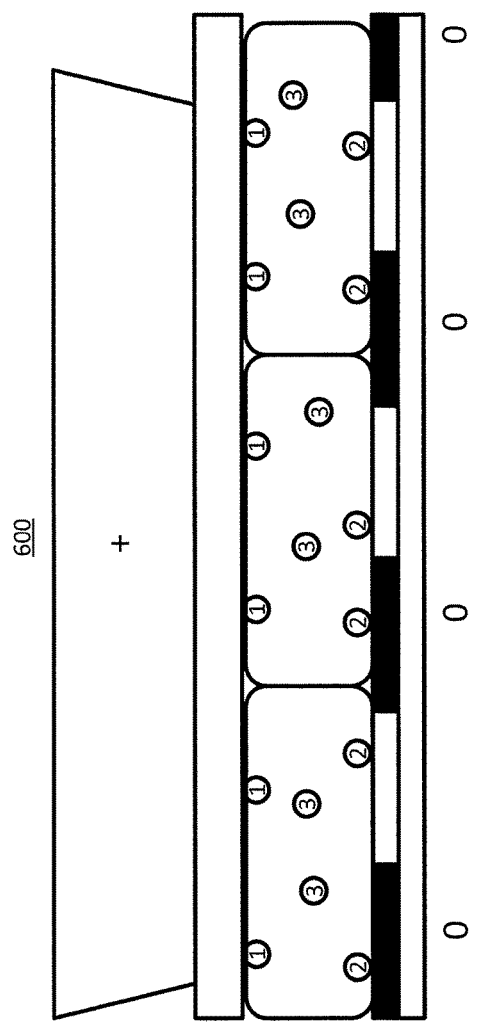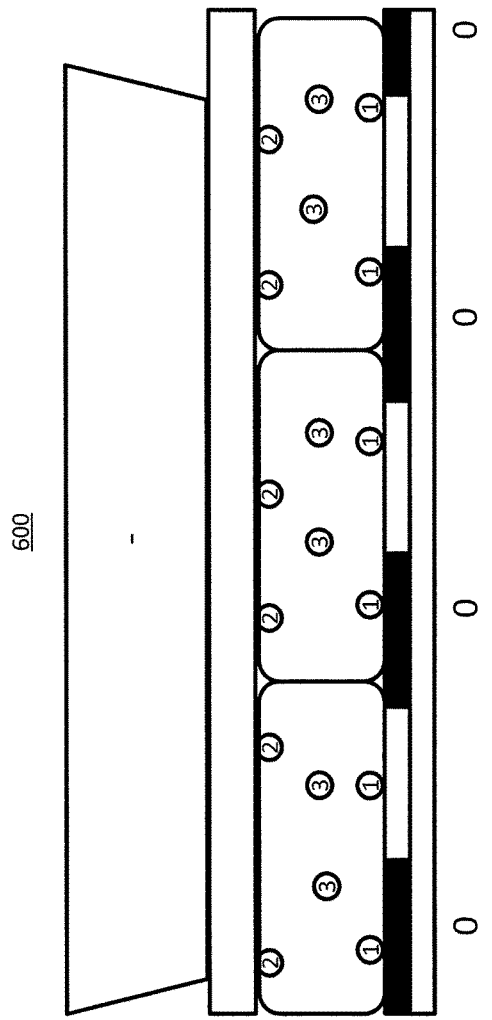

DEVICES AND TECHNIQUES FOR ELECTRONICALLY ERASING A DRAWING DEVICE

REFERENCE TO RELATED APPLICATIONS

This application claims benefit of copending Application Ser. No. 62/212,469, filed Aug. 31, 2015.

The entire contents of this copending application, and of all other U.S. patents and published and copending applications mentioned below, are herein incorporated by reference.

BACKGROUND OF INVENTION

This invention relates to devices and techniques for electronically erasing an image made with an electro-optic drawing device, especially an electrophoretic drawing device.

SUMMARY OF INVENTION

Accordingly, this invention provides an electronically-erasable drawing device comprising:
an electro-optic display medium capable of displaying two extreme optical states;
interdigitated electrodes disposed adjacent one surface of the electrophoretic display medium; and
voltage control means for controlling the potential of the interdigitated electrodes and capable of applying to the interdigitated electrodes voltages such that at least a portion of the electro-optic display medium is driven to a state intermediate the two extreme optical states of the medium.

In this electronically-erasable drawing device, the voltages on the interdigitated electrodes may be arranged to apply a fringing field to the electro-optic medium. The voltage control means may be arranged to apply voltages of different polarities to different ones of the interdigitated electrodes, or to apply an alternating voltage to at least one of the interdigitated electrodes. The electro-optic medium may comprise an electrophoretic medium comprising a plurality of electrically charged particles disposed in a fluid and capable of moving through the fluid under the influence of an electric field. The fluid may be liquid or gaseous. The electrically charged particles and the fluid may be confined within a plurality of capsules or microcells, or be present as a plurality of discrete droplets surrounded by a continuous phase comprising a polymeric material. A pitch of the interdigitated electrodes may be approximately equal to the average repeat distance of the capsules, microcells or plurality of discrete droplets in the same direction; the average gap between the interdigitated electrodes may be approximately equal to half this average repeat distance. The drawing device may comprise first and second interdigitated electrodes arranged to drive first and second portions of the electro-optic display medium respectively, and the voltage control means may be arranged to control the first and second interdigitated electrodes independently of one another. The drawing device may have a drawing surface on the opposed side of the display medium from the one surface bearing the interdigitated electrodes. The drawing device may further comprise a movable drawing implement capable of being moved over the drawing surface, and the voltage control means may be arranged to control the potential difference between at least one of the interdigitated electrodes and the drawing implement to alter the optical state of a portion of the display medium. The display medium may be a color display medium, for example a color electrophoretic display medium comprising at least three different types of electrophoretic particles having differing optical and electrophoretic properties.

This invention also provides an electronically-erasable drawing device comprising:
an electro-optic display medium capable of displaying two extreme optical states;
at least two electrodes disposed adjacent to one surface of the electrophoretic display medium; and
voltage control means for controlling the potential of the at least two electrodes so as to apply a fringing electrical field to the display medium, thereby driving at least a portion of the display medium to a state intermediate the two extreme optical states of the medium.

This drawing device of the invention may have any of the optional features of the drawing device previously described. In particular, the electro-optic material may comprise an electrophoretic material comprising a plurality of electrically charged particles disposed in a fluid and capable of moving through the fluid under the influence of an electric field. The fluid may be liquid or gaseous. The electrically charged particles and the fluid may be confined within a plurality of capsules or microcells, or be present as a plurality of discrete droplets surrounded by a continuous phase comprising a polymeric material.

This invention also provides an electronic drawing implement (which may be in the form of a stylus) for driving an electro-optic display medium capable of displaying two extreme optical states, the drawing implement comprising at least electrodes configured to apply a fringing electric field to the display medium from one side of the display medium, the fringing electric field being configured to drive a portion of the display medium adjacent the at least two electrodes to an intermediate optical state, the at least two electrodes being movable relative to the display medium.

In such a drawing implement, voltages of different polarities may be applied to different ones of the at least two electrodes, and/or an alternating voltage may be applied between two of the at least two electrodes. The at least two electrodes may also be capable of applying a magnetic field to the display medium.

BRIEF DESCRIPTION OF DRAWINGS

FIGS. 5A and 5B are schematic cross-sections, similar to those of FIG. 3B, through a second drawing system of the present invention.

FIG. 6A is a schematic cross-section, similar to that of FIG. 3A, through a color drawing device of the present invention.

FIGS. 6B-6D are schematic cross-sections, similar to those of FIG. 3B, showing three different optical states of a drawing system incorporating the drawing device of FIG. 6A.

DETAILED DESCRIPTION

Figure 2:
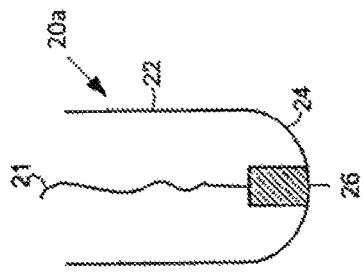
FIG. 2 is a schematic cross-section through a drawing implement of the present invention for addressing a display.

Before explaining in detail the specific embodiments of the present invention shown in the drawings, it is considered appropriate to set forth certain background information relating to electro-optic displays.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

Some electro-optic materials are solid in the sense that the materials have solid external surfaces, although the materials may, and often do, have internal liquid- or gas-filled spaces. Such displays using solid electro-optic materials may hereinafter for convenience be referred to as "solid electro-optic displays". Thus, the term "solid electro-optic displays" includes rotating bichromal member displays, encapsulated electrophoretic displays, microcell electrophoretic displays and encapsulated liquid crystal displays (all discussed in more detail below).

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example the aforementioned white and dark blue states.

The term "erasing" is used herein in its conventional meaning in the imaging art to refer to a process of setting a portion of a display (e.g., a pixel, multiple pixels, a region, or the entire display) from an state that conveys information to a viewer (for example, in the case of the entire display, by means of regions having contrasting optical properties) to a state that does not convey information (in the case of the entire display, a uniform state that may be an extreme state or an intermediate state).

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y, et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT), E Ink Corporation, E Ink California, LLC. and related companies describe various technologies used in encapsulated and microcell electrophoretic and other electro-optic media. Encapsulated electrophoretic media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. In a microcell electrophoretic display, the charged particles and the fluid are not encapsulated within microcapsules but instead are retained within a plurality of cavities formed within a carrier medium, typically a polymeric film. The technologies described in these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Microcell structures, wall materials, and methods of forming microcells; see for example U.S. Pat. No. 7,072,095 and U.S. Patent Application Publication No. 2014/0065369;

(d) Methods for filling and sealing microcells; see for example U.S. Pat. No. 7,144,942 and U.S. Patent Application Publication No. 2008/0007815;

(e) Films and sub-assemblies containing electro-optic materials; see for example U.S. Pat. Nos. 6,982,178 and 7,839,564;

(f) Backplanes, adhesive layers and other auxiliary layers and methods used in displays; see for example U.S. Pat. Nos. 7,116,318 and 7,535,624;

(g) Color formation and color adjustment; see for example U.S. Pat. Nos. 7,075,502 and 7,839,564;

(h) Methods for driving displays; see for example U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,061,166; 7,061,662; 7,116,466; 7,119,772; 7,177,066; 7,193,625; 7,202,847; 7,242,514; 7,259,744; 7,304,787; 7,312,794; 7,327,511; 7,408,699; 7,453,445; 7,492,339; 7,528,822; 7,545,358; 7,583,251; 7,602,374; 7,612,760; 7,679,599; 7,679,813; 7,683,606; 7,688,297; 7,729,039; 7,733,311; 7,733,335; 7,787,169; 7,859,742; 7,952,557; 7,956,841; 7,982,479; 7,999,787; 8,077,141; 8,125,501; 8,139,050; 8,174,490; 8,243,013; 8,274,472; 8,289,250; 8,300,006; 8,305,341; 8,314,784; 8,373,649; 8,384,658; 8,456,414; 8,462,102; 8,537,105; 8,558,783; 8,558,785; 8,558,786; 8,558,855; 8,576,164; 8,576,259; 8,593,396; 8,605,032; 8,643,595; 8,665,206; 8,681,191; 8,730,153; 8,810,525; 8,928,562; 8,928,641; 8,976,444; 9,013,394; 9,019,197; 9,019,198; 9,019,318; 9,082,352; 9,171,508; 9,218,773; 9,224,338; 9,224,342; 9,224,344; 9,230,492; 9,251,736; 9,262,973; 9,269,311; 9,299,294; 9,373,289; 9,390,066; 9,390,661; and 9,412,314; and U.S. Patent Applications Publication Nos. 2003/0102858; 2004/0246562; 2005/0253777; 2007/0070032; 2007/0076289; 2007/0091418; 2007/0103427; 2007/0176912; 2007/0296452; 2008/0024429; 2008/0024482; 2008/0136774; 2008/0169821; 2008/0218471; 2008/0291129; 2008/0303780; 2009/0174651; 2009/0195568; 2009/0322721; 2010/0194733; 2010/0194789; 2010/0220121; 2010/0265561; 2010/0283804; 2011/0063314; 2011/0175875; 2011/0193840; 2011/0193841; 2011/0199671; 2011/0221740; 2012/0001957; 2012/0098740; 2013/0063333; 2013/0194250; 2013/0249782; 2013/0321278; 2014/0009817; 2014/0085355; 2014/0204012; 2014/0218277; 2014/0240210; 2014/0240373; 2014/0253425; 2014/0292830; 2014/0293398; 2014/0333685; 2014/0340734; 2015/0070744; 2015/0097877; 2015/0109283; 2015/0213749; 2015/0213765; 2015/0221257; 2015/0262255; 2016/0071465; 2016/0078820; 2016/0093253; 2016/0140910; and 2016/0180777;

(i) Applications of displays; see for example U.S. Pat. Nos. 7,312,784 and 8,009,348; and (j) Non-electrophoretic displays, as described in U.S. Pat. No. 6,241,921 and U.S. Patent Application Publication No. 2015/0277160; and applications of encapsulation and microcell technology other than displays; see for example U.S. Pat. No. 7,615,325; and U.S. Patent Application Publications Nos. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

Other types of electro-optic media may also be used in the displays of the present invention.

Rendering an image on an electro-optic display is effected by applying different electric fields or impulses to differing regions of the electro-optic material. (The term "impulse" is used herein in its conventional meaning of the integral of voltage with respect to time. However, some bistable electro-optic media act as charge transducers, and with such media an alternative definition of impulse, namely the integral of current over time (which is equal to the total charge applied) may be used. The appropriate definition of impulse should be used, depending on whether the medium acts as a voltage-time impulse transducer or a charge impulse transducer.) In some monostable electro-optic media, for example liquid crystals, it is only necessary to control the electric field applied to each pixel of the display; the liquid crystal material eventually adopts the gray level associated with the value of the applied electric field. With bistable electro-optic media, it is normally necessary to control both applied electric field and the period for which it is applied, and, as discussed in some of the patents and published applications mentioned above relating to driving methods, there are additional complications due to memory effects, non-linear response to electric fields etc. Furthermore, bistable electro-optic media must be driven in both directions, e.g., for white to black and from black to white.

Erasing an image on an electro-optic display using a monostable electro-optic medium can readily be achieved simply by turning off all applied electric fields, whereupon the whole of the electro-optic medium reverts to its single stable state, and thus adopts a uniform optical state. Erasing an image on a electro-optic display using a bistable medium is less simple, since the impulse needed to drive any specific pixel to one specific optical state (so that all pixels can end up in the same optical state) varies with the optical state of the pixel prior to the erasure. Furthermore, although it might appear that, for example, all pixels of a black/white display could be driven to a uniform black by applying a black-going electric field for a long period, since a procedure would introduce problems of DC imbalance which, as discussed in several of the aforementioned patents and applications relating to driving displays, can cause damage and adverse effects to the electro-optic properties of certain types of electro-optic displays.

Erasure of images on electro-optic displays which have fixed electrodes on a backplane (such displays may be of the direct drive, passive matrix or active matrix types) can be achieved by careful choice of waveforms to drive the various pixels of the display to a uniform optical state. However, erasure of images is a serious problem in so-called "externally-addressed" displays (which may for convenience hereinafter be referred to as "stylus driven" displays) in which an image is formed by bringing a drawing implement, such as a stylus or print head, into close proximity or contact with a drawing surface of the electro-optic display such that an electric field forms between an electrode in the drawing implement and an electrode in the display. Hitherto, erasing images on stylus-driven displays has been achieved by local erase, which requires moving the writing implement over the portions of the display to be erased, a slow and cumbersome process which is very error-prone in that it is very easy to produce unwanted changes in optical state by contacting the drawing implement with portions of the display which do not need to be erased. The slow, cumbersome and error-prone nature of this erasing procedure has significantly impeded market acceptance of stylus-driven displays. Accordingly, there is a need for methods for global erasing of stylus-driven displays, and global erasing methods can usefully be applied to other types of displays. ("Global erasing" requires resetting all pixels of a display to an essentially uniform optical state. It does not require all pixels to be addressed exactly simultaneously but it is preferred that all pixels be addressed within a short span of time, for example not longer than a few seconds.)

In accordance with the present invention, erasure of stylus-driven and other electro-optic displays can be achieved by generating an electric field between electrodes on the same side of the display's electro-optic medium, rather than generating an electric field between electrodes on opposing surfaces of this medium. The electric field may be a fringing field, a term which is used herein to refer to the electric field which is generated out of the plane in which two electrodes held at different potentials are located. As is well known to those skilled in the electrical arts, when different potentials are applied to two (or more) electrodes located in a common plane, the electric field between the electrodes is not confined to the common plane but extends outwardly in both directions perpendicular to this plane because of the repulsion between adjacent lines of force. The electrodes may be interdigitated, a term which is used herein in its normal sense of resembling interlaced fingers on two hands; more specifically, two electrodes are to be considered interdigitated if an elongate portion of one electrode extends between and substantially parallel to two elongate portions of the other electrode.

The drawing devices and drawing implements of the present invention can permit an entire display may be erased (i.e., globally erased) in a very short amount of time (e.g., less than a second) using a very simple control mechanism (e.g., activating a switch that controls the signals applied to the devices' electrodes). A drawing implement of the present invention may be used to locally erase portions of a stylus-driven display. The drawing implement may include two or more electrodes, and the pixels proximate to the drawing implement's tip may be erased by generating a fringing electric field between the drawing implement's electrodes.

The present invention provides disclosure, an erasable electronic display. The display may have a backplane including patterned electrodes (e.g., interdigitated electrodes). To erase the display globally or regionally, adjacent electrodes in the backplane may be set to different potentials (e.g., potentials of different polarities), such that fringing fields (e.g., fringing electric fields) are formed through the display medium. If the display used an encapsulated electrophoretic medium, the fringing fields may swirl the contents of the display medium's capsules, thereby "erasing" the capsules throughout the display or in the region of the display covered by the activated electrodes. Electrode configurations other than interdigitated electrodes may alternatively or additionally be used to create fringing fields to perform the erasure.

The present invention also provides a drawing implement for an erasable electronic display. The drawing implement may include multiple electrodes. To erase the display locally, adjacent electrodes in the drawing implement may be set to different potentials (e.g., potentials of different polarities), such that fringing fields are formed through the display medium. If the display used an encapsulated electrophoretic medium, the fringing fields may swirl the contents of the display medium's capsules, thereby "erasing" the capsules in the vicinity of the drawing implement.

The various aspects of the present invention described above, as well as further aspects, will now be described in detail below. It should be appreciated that these aspects may be used alone, all together, or in any combination of two or more, to the extent that they are not mutually exclusive.

Figure 1:
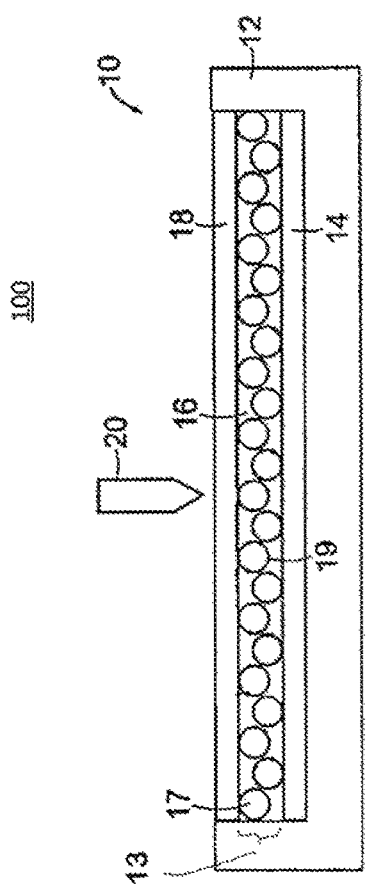
FIG. 1 of the accompanying drawings is a schematic cross-section through a first drawing device of the present invention.

FIG. 1 shows a drawing system (generally designated 100) comprising a display 10 and a mobile drawing implement or stylus 20. Display 10 further comprises a casing 12, a rear electrode layer 14 disposed inside the casing 12, a layer of electro-optic medium 13 disposed adjacent the rear electrode layer 14, and a protective layer 18 disposed adjacent the display medium 13.

Protective layer 18 may serve as a drawing surface. Drawing implement 20 may include a charge conducting mechanism, and may be a writing device (e.g., a stylus). The display 10 may be addressed mechanically by means of a robotic arm or charge-carrying print head that is moved relative to the drawing surface. For example, an external printhead may be used to draw on the drawing surface. When the implement 20 contacts the drawing surface, the implement 20 and the rear electrode layer 14 may apply an electromagnetic field (e.g., an electric field and/or a magnetic field) across the display medium 13, and thereby display an image on the drawing surface of the system 100.

The casing 12 may be a plastic container (or container of another material) capable of holding the electro-optic display medium 13, the rear electrode layer 14, and/or any necessary electronics. The casing 12 may be of any size, ranging from small for toy applications to large for applications in large-scale presentation displays, and may include compartments for storing mobile drawing implement 20 and/or other accessories.

The electro-optic material 13 may be a particle-based electrophoretic material, and may include at least two phases: an electrophoretic contrast medium phase 17 (i.e., discontinuous phase) and a coating/binding phase 16 (i.e., continuous phase). The electrophoretic phase 17 includes, in some embodiments, a single species of electrophoretic particles dispersed in a clear or dyed medium, or more than one species of electrophoretic particles having distinct physical and electrical characteristics dispersed in a clear or dyed medium. In some embodiments, the electrophoretic phase 17 is encapsulated, such that a capsule wall 19 surrounds the electrophoretic particles and suspending fluid. The electro-optic material 13 may be of any of the prior art types discussed in the patents and applications discussed above relating to electrophoretic and other electro-optic media.

Drawing implement 20 may be mechanically coupled to display 10, for example by one or more wires configured to carry electrical signals between the implement 20 and the display 10. Display 10 may provide the power source for implement 20. Alternatively, implement 20 may be wireless (i.e., implement 20 may not be coupled to display 10 by any wires), and may include its own power source.

FIG. 2 shows a schematic cross-section through, a drawing implement 20a (e.g., a stylus) comprising an elongate probe 22 with a tip 24, which may be small to permit drawing of a fine line, and may be rounded. The tip 24 may include an electrode 26 which is flush with or adjacent a surface of the tip 24. The electrode 26 may encompass a smaller area than the tip 24, and may be connected to a voltage source (not shown) through one or more wires 21. A rounded tip on the implement 20a permits a wider area of the implement 20a to contact a drawing surface, while allowing a fine line to be drawn without puncturing the drawing surface. The electrode 26 is covered with a dielectric coating (not shown), which protects the implement 20a and prevents exposure of the electrode 26 to the environment. The tip 24 of the implement 20a may comprise an elastomeric material.

A drawing implement or stylus used in the present apparatus may include a damping mechanism (e.g., a spring) built into its tip to cushion the drawing surface from physical forces (e.g., physical forces caused by the motion of a user's hand).

Figure 3A:
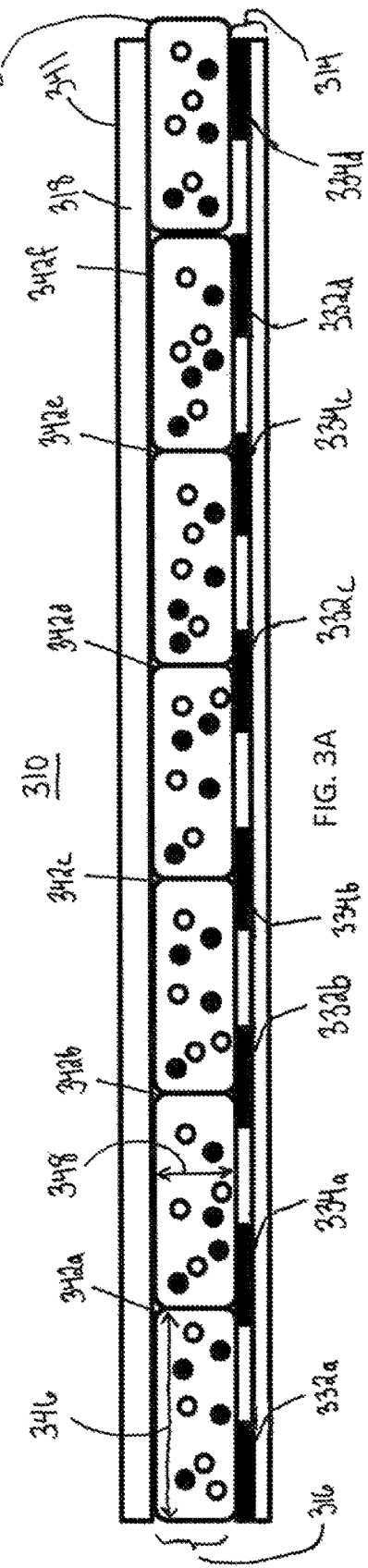
FIG. 3A is a schematic cross-section through a second drawing device of the present invention.

FIG. 3A is a cross-section through a display unit 310 comprising a rear electrode layer 314 and a display medium 316. The display medium 316 is interposed between a drawing surface 341 and the rear electrode layer 314. Rear electrode layer 314 may include two or more electrodes (e.g., first electrode 332 and second electrode 334). The potentials of the two or more electrodes may be controlled independently, which may be beneficial, for example, to create fringing fields as described herein.

Display medium 316 may be an electrophoretic display medium comprising a plurality of capsules 342. In FIG. 3A, each capsule 342 includes first and second types of particles with different (e.g., contrasting) optical properties suspended in a substantially clear suspending fluid, but this is not limitative and the capsules of display medium 316 may include any suitable number of particle types suspended in any suitable suspending fluid.

Display unit 310 may include a protective layer 318 disposed adjacent the display medium 316. A surface of protective layer 318 may serve as a drawing surface 341 for the drawing system. Suitable protective layers are described above with reference to FIG. 1. Some variants of display unit 310 may not include electrodes on the drawing surface side ("front") of display medium 316; instead, the display medium 316 may be externally addressed by a mobile drawing implement.

Display unit 310 may include a display controller (e.g., control circuit) (not shown), which may control the operation of display unit 310 by controlling the electrical potentials of the electrodes in rear electrode layer 314. The display controller may control the electrical potentials of the electrodes in rear electrode layer 314 by controlling the application of charge to rear electrode layer 314 by a charge-generating mechanism (not shown), as described above with reference to FIG. 1. The display controller may be implemented using any suitable processing device (e.g., a microcontroller, microprocessor, application-specific integrated circuit, etc.). The display controller may selectably configure display unit 310 to operate in a "drawing mode" or an "erasing mode." The display controller may configure display unit 310 to operate in the "drawing mode" by setting the electrodes of rear electrode layer 314 to the same electrical potential (e.g., electrical ground), thereby allowing a drawing implement to externally address the display medium 316 by setting the drawing implement's electrode to a different electrical potential. The display controller may configure drawing unit 310 to operate in the "erasing mode" by setting the electrodes of rear electrode layer 314 to different electrical potentials (e.g., by applying an AC voltage across the electrodes of electrode layer 314). A user may control the drawing system's operating mode by providing input to the display controller using any suitable technique (e.g., pressing a button communicatively coupled to the display controller, activating a switch communicatively coupled to the display controller, issuing a voice command, operating a software-based user interface, etc.). The drawing and erasing modes are discussed in further detail below.

Figure 3B:
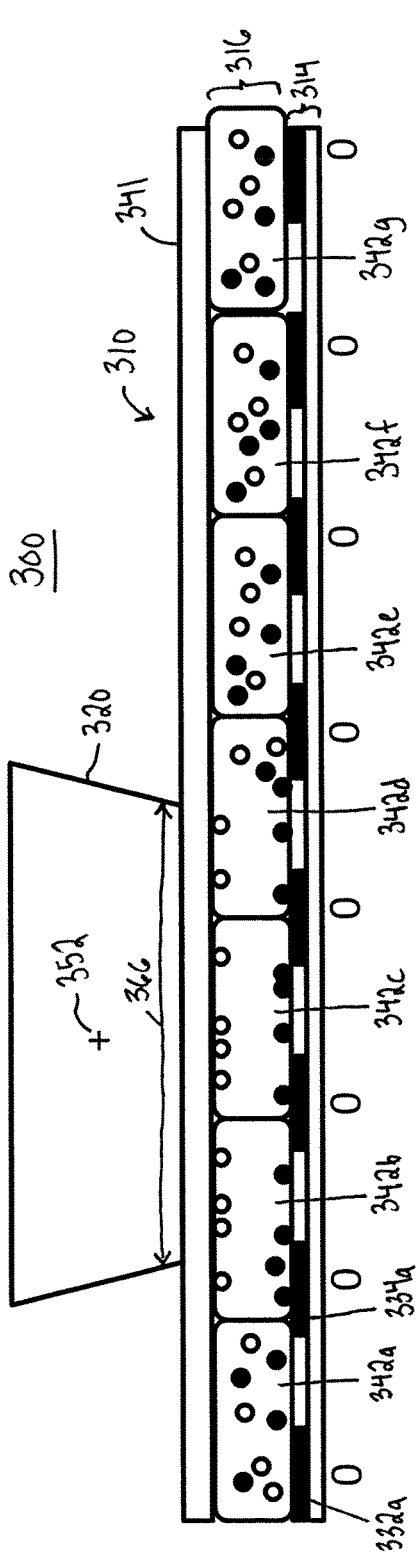
FIG. 3B is a schematic cross-section through a drawing system incorporating the drawing device of FIG. 3A.

FIG. 3B shows a cross-section through a display system 300 which includes a display unit 310 and a drawing implement 320. The drawing implement may be a stylus. The width 366 of the tip of the drawing implement may be at least two times the width 346 of a capsule 342. Alternatively, drawing implement 320 may be a printhead or a portion thereof. Some embodiments of mobile drawing implements are described above with reference to FIG. 2.

Implement 320 may include an electrode (not shown) which may be set to an electrical potential 352. When the electrical potential 352 differs from the electrical potential of an opposing electrode in rear electrode layer 314, an electric field is applied to one or more capsules 342 disposed between the implement 320 and the rear electrode layer 314, thereby driving the one or more capsules to a corresponding optical state.

FIG. 3B illustrates drawing system 300 operating in a drawing mode, with the electrodes of rear electrode layer 314 are grounded (as indicated zeroes in FIG. 3B). Although grounding the electrodes of rear electrode layer 314 is not essential in the drawing mode, setting the electrodes of rear electrode layer 314 to a common potential throughout an area may enhance the uniformity of the drawing system's optical properties throughout that area. For example, when the electrodes of rear electrode layer 314 are set to a common potential and implement 320 is used to externally address the display medium, the markings displayed by drawing system 300 may be sufficiently uniform in color. The common electrical potential may be any suitable electrical potential, including, without limitation, electrical ground.

In the drawing mode, an electrode of implement 320 may be maintained at an electrical potential 352. When the tip of implement 320 is placed close to display medium 316 (e.g., in contact with drawing surface 341), the voltage difference between rear electrode layer 314 and the drawing implement's electrode will cause an electric field to form between rear electrode layer 314 and the drawing implement's electrode, through the capsules 342 adjacent to the tip of the drawing implement. This electric field may drive the contents of these capsules to a corresponding optical state (e.g., color). Since the display medium 316 is bistable (or multistable), these capsules retain their optical state even after the electric field is removed (e.g., after the tip of drawing implement 320 is moved away from the capsules).

In FIG. 3B, the electrode of drawing implement 320 is charged to a positive electrical potential 352, and the electric field formed between the drawing implement's electrode and rear electrode layer 314 drives capsules 342b-342d to a white state, with white, negatively-charged particles at the top of the capsules and black, positively-charged particles at the bottom of these capsules. Capsules 342a and 342e-g, which are not addressed by drawing implement 320, remain in a gray state, with white and black particles dispersed uniformly throughout each capsule.

The optical states and electrical potentials shown in FIG. 3B are non-limiting examples. The capsules 342 may include roughly equal amounts of black and white ink particles dispersed in a substantially clear suspending fluid, such that the gray state of a capsule is gray in color. Alternatively, the capsules 342 may include more white ink particles than black ink particles, such that the gray state of a capsule is substantially white in color. The electrode of drawing implement 320 may be charged to a positive or negative electrical potential relative to rear electrode layer 314 to drive capsules near the drawing implement's tip to white or black states, respectively. Thus, drawing system 300 may, for example, permit a user to draw black-on-gray, white-on-gray, or black-on-white, depending on the composition of the capsules 342 and the relative potentials of the drawing implement 320 and the rear electrode layer 314.

Implement 320 may include an implement controller (e.g., control circuit) (not shown), which may control the operation of drawing implement 320 by controlling the electrical potential of the drawing implement's electrode. The implement controller may control the electrical potential of the drawing implement's electrode by controlling the application of charge to the electrode by a charge-generating mechanism (not shown). Some embodiments of a charge-generating mechanism are described above. The implement controller may be implemented using any suitable processing device (e.g., a microcontroller, microprocessor, application-specific integrated circuit, etc.).

The implement controller may selectably configure drawing implement 320 to draw in a first optical state (e.g., first color) or in a second optical state (e.g., second color). The implement controller may configure drawing implement 320 to draw in the first optical state by setting the drawing implement's electrode to a negative electrical potential relative to rear electrode layer 314, and in the second optical state by setting the drawing implement's electrode to a positive electrical potential relative to rear electrode layer 314. A user may control the drawing implement's operation by providing input to the implement controller using any suitable technique (e.g., pressing a button communicatively coupled to the implement controller, activating a switch communicatively coupled to the implement controller, issuing a voice command, operating a software-based user interface, etc.).

Figure 3C:
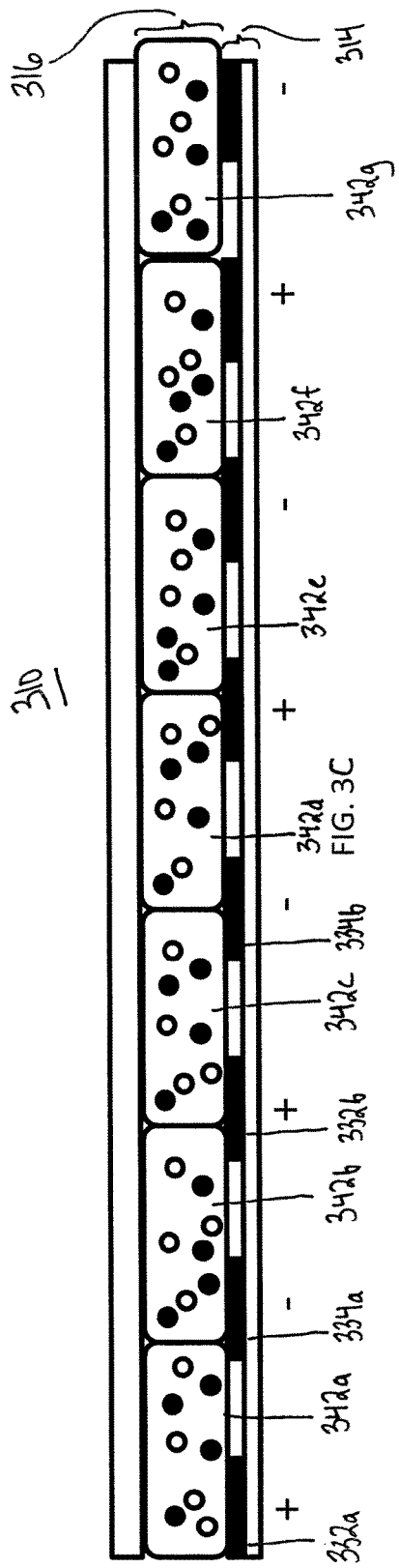
FIG. 3C is a schematic cross-section similar to that of FIG. 3A.

FIG. 3C shows a cross-section through drawing unit 310 in a second state in erasing mode. In erasing mode, voltages ("erasing voltages") may be established between adjacent electrodes of rear electrode layer 314, thereby causing electric fields to form between the electrodes. The resultant fringing fields penetrate capsules 342 and drive them to a gray state. The fringing fields may induce electro-osmotic flow in the capsules 342, which may "swirl" (e.g., randomly mix) the particles in the capsules. Swirling the particles may quickly and efficiently drive the capsules to a gray state. Some embodiments of "erasing voltages" and configurations of electrode layer 314 suitable for efficiently erasing display medium 316 are described below.

Display medium 316 (or portions thereof) may be erased by establishing an "erasing voltage" across electrodes on the same side of the display medium (e.g., electrodes 332 and 334 in rear electrode layer 314). The electrical potentials applied to the electrodes to establish the erasing voltage may have the same polarities or opposite polarities. In FIG. 3C, the electrical potentials applied to electrodes 332 and 334 have opposite polarities, as indicated by "+" and "−" symbols respectively. The amplitude of the erasing voltage may typically be between 10 and 240 volts, preferably between 10 and 120 volts. The erasing voltage may be an AC voltage, which may have a frequency between 1 and 1000 Hz (e.g., between 10 and 100 Hz, or between 10 and 60 Hz). Alternatively, the erasing voltage may be a DC voltage. However, AC erasing voltages may tend to produce a more uniform optical state across the erased portion of the display medium, whereas DC erasing voltages may tend to produce thin stripes across the erased portion of the display medium.

The swirling of particles induced by application of the erasing voltage may cause the electrophoretic particles to randomly mix. By randomly mixing a capsule's electrophoretic particles, the erasing voltage may drive the capsule to a gray state, irrespective of the prior optical state of the capsule, and thus the erasing voltage required does not depend on the capsule's prior optical state. Also, when an erasing voltage is applied to electrodes adjacent to display medium 316, suitable erasure of that portion of the display medium may be achieved, in some embodiments, by applying the erasing voltage for a relatively short time period (e.g., less than one second).

Figure 3D:
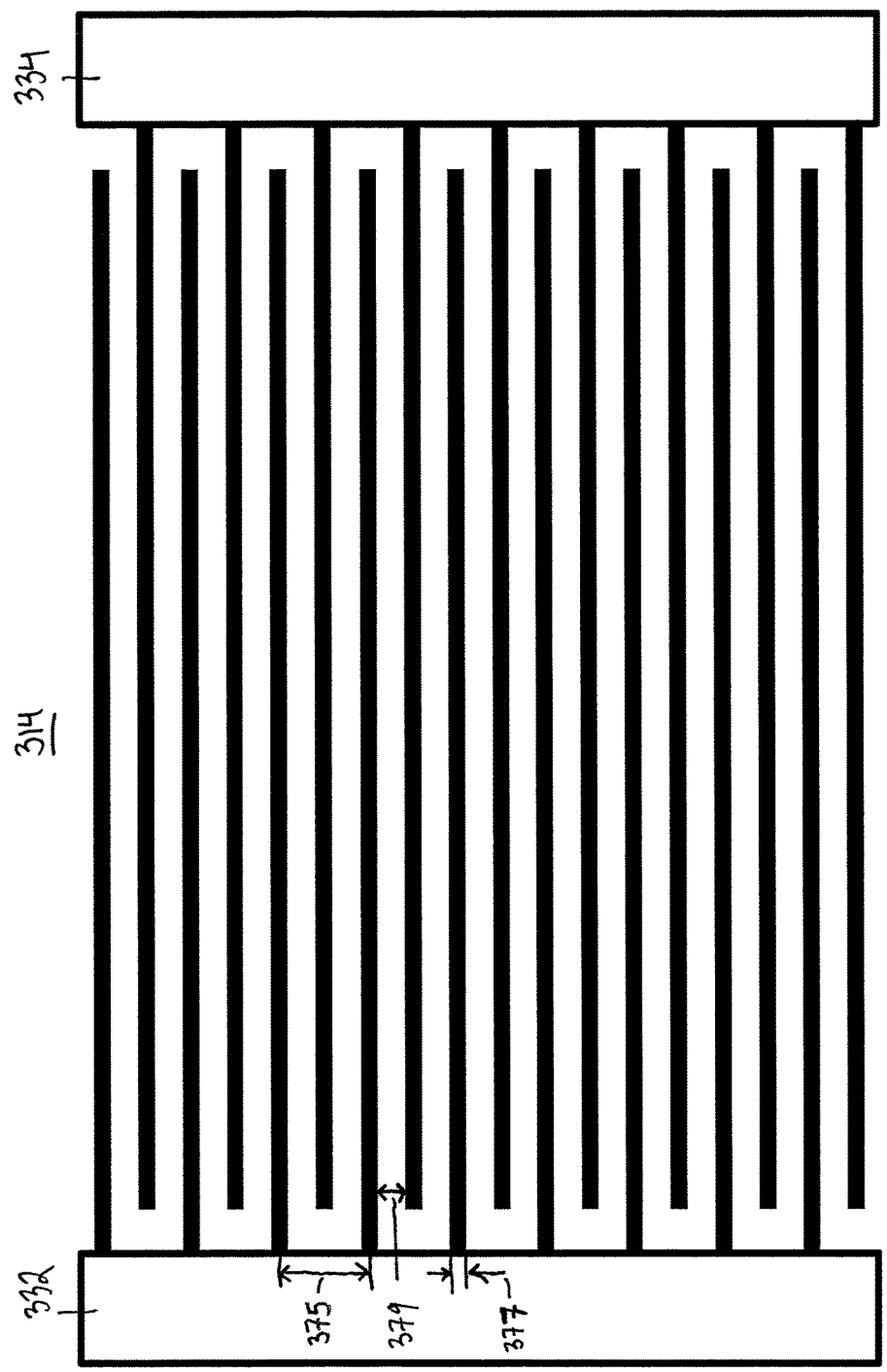
FIG. 3D is a top plane view of the set of interdigitated electrodes used in the drawing device of FIGS. 3A-3C.

The electrodes of electrode layer 314 may be interdigitated to facilitate erasure. FIG. 3D is a top plane view of a rear electrode layer 314 with interdigitated electrodes 332 and 334. The inter-digital gap 379, digital width 377, and pitch 375 of the interdigitated electrodes may be determined based, at least in part, on the width 346 ("ink width") and thickness 348 ("ink thickness") of the capsules 342. The nominal value of the ink width 346 may be 50 microns, and the nominal value of the ink thickness 348 may be 20 microns.

Although the interdigitated electrodes may have any suitable dimensions, it has been observed empirically that some electrode configurations which enhance performance in the erasing mode may impede performance in the drawing mode, and vice versa. For example, in drawing mode, performance may be enhanced when the inter-digital gap 379 between digits of the interdigitated electrodes is as small as possible, because increasing the area of electrode layer 314 that is set to a uniform potential may improve the resolution of the drawing system's external addressing. Similarly, the resolution of external addressing may be enhanced in drawing mode when the width 377 of each elongate portion of the interdigitated electrode is approximately equal to the width 346 of a capsule, and when each capsule 342 is centered on top of an elongate portion. By contrast, in erasing mode, performance may be enhanced when the inter-digital gap 379 and the digital width 377 of the interdigitated electrodes are both between the thickness 348 of the ink capsules and two times the width 346 of the ink capsules, because these configurations may produce fringing fields which mix the electrophoretic particles more uniformly.

Electrode configurations have been identified that provide suitable performance in both the drawing mode and the erasing mode (e.g., electrode configurations that provide suitable resolution for external addressing and suitable uniformity among erased capsules). The inter-digital gap 379, digital width 377, and pitch 375 of the interdigitated electrodes may be equal to, respectively, half the ink width 346 (e.g., 25 microns), half the ink width 346 (e.g., 25 microns), and the ink width (e.g., 50 microns).

Although the rear electrode layer 314 in FIG. 3D includes a single pair of interdigitated electrodes which underlies the entire display medium 316, this is not essential and the electrodes of rear electrode layer 314 may be configured in any suitable pattern such that setting the electrodes to suitable electrical potentials generates fringing fields suitable for erasing the capsules of display medium 316. The electrodes of rear electrode layer 314 may not be interdigitated. The electrodes may be configured such that the application of suitable electrical potentials to the electrodes erases display medium 316 and causes a pattern to be formed on display medium 316 (e.g., a pattern of lines to facilitate legible writing on the display medium, similar to the manner in which lines on ruled sheets of paper facilitate legible writing).

The rear electrode layer may include two or more sets of electrodes configured to control erasure of corresponding regions of display medium 316. In a regional erasure operation, an erasing voltage may be applied to one set of electrodes to erase a corresponding region of the display medium 316, whereas in an inter-regional erasure operation, an erasing voltage may be applied to two or more sets of electrodes to erase corresponding regions of the display medium 316, and in a global erasure operation, an erasing voltage may be applied to all sets of electrodes to erase all regions of the display medium 316. These operations may be controlled by the user through the display controller.

Figures 4A, 4B:
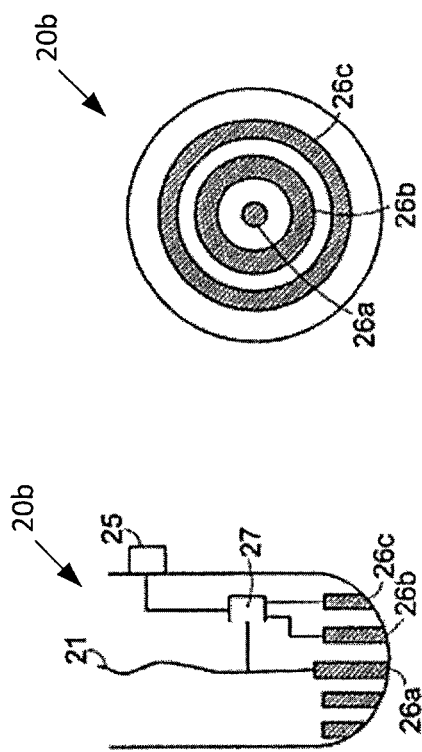
FIG. 4A is a schematic cross-section, similar to that of FIG. 2, through a second drawing implement of the present invention.
FIG. 4B is a bottom plan view of the drawing implement shown in FIG. 4A.

FIGS. 4A and 4B are respectively a schematic cross-section through, and an underneath plan view of, a drawing implement 20b including two or more electrodes 26 that are insulated from each other. One or more voltages may be applied to all or any of the electrodes 26 to control the width and/or shape of a line drawn on a display device by the drawing implement. For example, when an electromagnetic field is applied through only electrode 26a, a thin line may be drawn on the drawing surface; however, when an electromagnetic field is applied through both electrodes 26a and 26b, a thicker line may be drawn, and an even thicker line may be drawn when an electromagnetic field is applied through three electrodes 26a, 26b, and 26c. The width of the line drawn may be controlled otherwise than by varying the voltage applied across the display medium; for example, the duty cycle or the magnitude and/or duration of voltage applied can be varied.

Drawing implement 20b may include an implement controller (e.g., control circuit) 27, which may control the operation of drawing implement 20b by controlling the electrical potentials of the electrodes 26. The controller 27 may control the electrical potential of the electrodes 26 by controlling the application of charge to the electrodes by a charge-generating mechanism (not shown), as described above. Controller 27 may use any suitable processing device (e.g., a microcontroller, microprocessor, application-specific integrated circuit, etc.).

Controller 27 may selectably configure drawing implement 20b to draw in a first optical state (e.g., first color) or in a second optical state (e.g., second color). The controller may configure drawing implement 20b to draw in the first optical state by setting electrode(s) 26 to a negative electrical potential relative to the rear electrode layer of the drawing system, and to draw in the second optical state by setting electrode(s) 26 to a positive electrical potential relative to the drawing system's rear electrode layer. A user may control the drawing implement's operation by providing input to the implement controller using any suitable technique (e.g., pressing a button communicatively coupled to the implement controller, activating a switch 25 communicatively coupled to the implement controller, issuing a voice command, operating a software-based user interface, etc.).

FIG. 5A is a cross-section through a drawing system 500 in a first state in which a display unit 510 may be erased by a fringing electric field applied by a mobile drawing implement 520. Drawing system 500 may be similar to drawing system 300 in many respects. For example, drawing system 500 may include a display device 510 and a mobile drawing implement 520. Display device 510 may include a rear electrode layer 514, a protective layer 518, and a display medium 516 disposed between the rear electrode layer and the protective layer. Display medium 516 may comprise an electrophoretic display medium, which may include a plurality of capsules 542. One surface of protective layer 518 may serve as a drawing surface 541. Display device 510 may include a display controller (e.g., control circuit) (not shown), which may control the electrical potential of rear electrode layer 514 (e.g., by controlling the application of charge to rear electrode layer 514 by a charge-generating mechanism).

However, drawing system 500 differs from drawing system 300 in several respects. Rear electrode layer 514 may comprise a single electrode (e.g., a plate electrode) that underlies display medium 516. However, this is not essential and rear electrode layer 514 may comprise any suitable number and/or configuration of electrodes. The display controller may be configured to set the electrode(s) of rear electrode layer 514 to a constant electrical potential (e.g., electrical ground). Display medium 516 may be externally addressed by mobile drawing implement 520, which may include two or more electrodes 562 and an implement controller (e.g., control circuit) (not shown) configured to control the operation of implement 520 by controlling the electrical potentials of the electrodes 562. The controller may selectably configure drawing implement 520 to draw in one of two or more optical states (e.g., colors) or to erase a portion of display medium 516.

When the electrical potential(s) 552 of the electrode(s) 562 differ(s) from the electrical potential of rear electrode layer 514, an electric field will be applied to one or more capsules 542 disposed between the drawing implement 520 and the rear electrode layer 514, thereby driving the one or more capsules to a corresponding optical state. Thus, the controller may control drawing implement 520 to draw in a first optical state (e.g., color) by setting one or more electrodes 562 to a positive electrical potential relative to the rear electrode layer 514, with the remaining electrodes 562 set to an electrically floating state or to the same electrical potential as rear electrode layer 514. Alternatively, the controller may control implement 520 to draw in a second optical state (e.g., color) by setting one or more electrodes 562 to a negative electrical potential relative to rear electrode layer 514, with any remaining electrodes 562 set to an electrically floating state or to the same electrical potential as rear electrode layer 514.

FIG. 5A shows drawing system 500 operating in a "drawing mode," with implement 520 being used to draw on the display medium 516, rear electrode layer 514 grounded and the electrodes 562 set to a positive potential relative to the potential of the rear electrode layer. Thus, the capsules addressed by implement 520 are driven from the gray state to the white state.

The optical states and electrical potentials shown in FIG. 5A are not limitative. As discussed above, the optical state to which implement 520 drives the display medium depends on the voltage between implement 520 and rear electrode layer 514, and on the contents of the capsules 542 (e.g., the optical properties and relative amounts of the electrophoretic particles and the suspending fluid). Rear electrode layer 514 may be set to any suitable electrical potential in the drawing mode, including, without limitation, electrical ground, and one or more electrodes 562 may be set to any suitable electrical potential in the drawing mode, including, without limitation, a first electrical potential greater than the potential of rear electrode layer 514 or a second electrical potential less than the potential of rear electrode layer 514, where the first and second electrical potentials correspond to first and second optical states of display medium 516, respectively.

FIG. 5B shows a cross-section through drawing system 500 operating in an erasing mode. In the erasing mode, one or more voltages ("erasing voltages") may be established between adjacent electrodes of implement 520, thereby causing electric fields to form between the electrodes, so that the fringing fields associated with these electric fields penetrate the capsules 542 adjacent to the drawing implement's tip and drive those capsules to a gray state (e.g., by swirling the contents of the capsules), thereby erasing the capsules in an area local to the drawing implement's tip. "Erasing voltages" and configurations of the drawing implement's electrodes suitable for erasing display medium 516 are described below.

A portion of display medium 516 adjacent to a tip of implement 520 may be erased by establishing an "erasing voltage" across electrodes of the implement 520. The electrical potentials applied to the electrodes to establish the erasing voltage may have the same polarities or, as shown in FIG. 5B, opposite polarities. The magnitude of the erasing voltage may typically be between 10 and 240 volts, preferably between 10 and 120 volts. The erasing voltage may be an AC voltage, and may have a frequency between 1 and 1000 Hz (e.g., between 10 and 100 Hz, or between 10 and 60 Hz). Alternatively, the erasing voltage may be a DC voltage. Suitable erasure of the portion of the display medium adjacent to the drawing implement's tip may be achieved by applying the erasing voltage to the drawing implement's electrodes for a relatively short time period (e.g., less than one second).

With respect to suitable electrode configurations, the same considerations that apply to the electrodes in rear electrode layer 314 of drawing system 300 are also applicable to the electrodes 562 of drawing implement 520. The gap 579 between adjacent electrodes 562 in the tip of the drawing implement, the width 577 of an electrode 562, and the pitch 575 of the electrodes 562 may be determined, at least in part, based on the width ("ink width") and thickness ("ink thickness") of the capsules 542. The inter-electrode gap 579, electrode width 577, and electrode pitch 575 may, for example, be equal to half the ink width (e.g., 25 microns), half the ink width (e.g., 25 microns), and the ink width (e.g., 50 microns), respectively. The electrodes of implement 520 may be configured in any suitable pattern such that setting the electrodes to suitable electrical potentials generates fringing fields suitable for erasing the capsules of display medium 516. The electrodes 562 may be arranged in concentric circles as shown in FIGS. 4A and 4B.

The implement controller may control implement 520 to erase one or more capsules adjacent to the tip of the implement by establishing an erasing voltage between two or more of the implement's electrodes. Any remaining electrodes 562 in implement 520 may be set to an electrically floating state or to the same electrical potential as rear electrode layer 514.

In FIG. 5B, rear electrode layer 514 is grounded, and an erasing voltage is established between electrodes 562$a$ and 562$b$ of implement 520. The voltage between the drawing implement's electrodes causes an electric field to form between the electrodes, and the fringing field penetrates capsules 542b-d, thereby erasing capsules 542b-d. The optical states and electrical potentials shown in FIG. 5B are non-limitative.

Aspects of drawing system 300 and drawing system 500 may be combined. For example, a drawing system may include a rear electrode layer 314 with two or more electrodes configurable to perform regional, inter-regional, and/or global erasure of a display medium, as well as a drawing implement 520 configurable to draw on the display medium and/or perform local erasure of the display medium.

The present invention can be applied to a color drawing system (e.g., a drawing system for drawing in three or more colors, and/or a drawing system for drawing in at least one color other than black, white, or gray). Such a color drawing system may include a color display unit having a rear electrode layer with two or more electrodes configurable to perform regional, inter-regional, and/or global erasure of a color display medium. Global erasure (or regional or inter-regional erasure) may be performed to reset the color display unit (or a portion thereof) to an intermediate optical state prior to selecting a color and drawing on the display unit. A color drawing system may include a drawing implement configurable to draw on the display medium (e.g., in three or more colors, and/or in at least one color other than black, white, or gray) and/or perform local erasure of the display medium. A drawing implement suitable for a color display may use electromagnetic fields to control particles of different colors, which may have different electrical charges and/or different magnetic properties.

FIG. 6A is a cross-section through a color drawing system (generally designated 600). The capsules of the color drawing system's electrophoretic display medium may contain three or more different types of pigment particle; in FIG. 6A, each capsule includes three different types of pigment particle, designated 1, 2 and 3. The different types of pigment particles may differ from each other optically; for example, the particles may be reflective or transmissive, and may be white, black, or colored. Al three pigment types may be scattering. These different types of pigment particles also may have different electrophoretic responses; for example, particles may be positively charged, negatively charged, uncharged, and/or magnetic, such that particles of different types respond differently to an electromagnetic field. Particles 1, 2, and 3 may be transmissive pigment particles, particles 1 and 2 may be oppositely charged, and particle 3 may be uncharged and ferromagnetic or superparamagnetic. For example, pigment particle 1 may be white and negatively charged, pigment particle 2 may be red and positively charged, and pigment particle 3 may be cyan and ferromagnetic or superparamagnetic.

In FIG. 6A, the display unit of color drawing system 600 is operating in an erasing mode, and the pigment particles in the display unit's capsules are in an intermediate optical state. The application of a fringing electric field through a capsule of color drawing system 600 may result in swirling of the capsule's pigment particles. The electrically charged particles may begin to swirl in response to the application of the electrical field, and the fluid motion created by the movement of the electrically charged particles may effectively swirl any uncharged pigment particles (e.g., uncharged magnetic pigment particles).

A drawing implement may selectably apply an electrical field, a magnetic field, and/or an electromagnetic field to a color display unit. As described above, a user may control the drawing implement's operating mode by providing input to the drawing implement's implement controller using any suitable technique.

FIGS. 6B-6D show cross-sectional views of color drawing system 600 operating in three optical states. In FIG. 6B, the display unit is operating in a drawing mode, and the drawing implement is exerting a magnetic field on the display unit's capsules, which were previously in the erased state, thereby bringing the magnetic pigment particles 3 to the front surfaces (upper surfaces as illustrated) of the capsules. In FIG. 6C, the display unit is operating in a drawing mode, and the drawing implement is creating a positive voltage across the display unit's capsules, which were previously in the erased state, thereby bringing the negatively charged pigment particles 1 to the front surfaces of the capsules. In FIG. 6D, the display unit is operating in a drawing mode, and the drawing implement is creating a negative voltage across the display unit's capsules, which were previously in the erased state, thereby bringing the positively charged pigment particles 2 to the front surfaces of the capsules.

The colors produced by the optical states shown in FIGS. 6A-6D are shown in Table 1.

TABLE 1

| FIG. | Drawing implement's state | Rear electrode's mode | Display color |
| --- | --- | --- | --- |
| FIG. 6A | | Erasing | Gray |
| FIG. 6B | Magnetic | Drawing; Preferably Ground | Cyan |
| FIG. 6C | Positively charged relative to rear electrode, Non-magnetic | Drawing | White |
| FIG. 6D | Negatively charged relative to rear electrode, Non-magnetic | Drawing | Red |

In another similar display, particle type 1 may be transmissive magenta with a negative electrical charge, particle type 2 may be transmissive yellow with a positive electrical charge, and particle type 3 may be transmissive cyan and magnetic. The fluid may include sufficient neutral (e.g., uncharged, non-magnetic) white particles such that only the pigment particles near the viewing surface of the display unit's capsules are visible to a user. A color display having capsules with such particles may be addressed as shown in Table 2 to produce the colors listed in Table 2.

TABLE 2

| Drawing implement's state | Rear electrode's mode | Display color |
| --- | --- | --- |
| | Erasing | Gray |
| Magnetic | Drawing; Preferably Ground | Cyan |
| Positively charged relative to rear electrode, Non-magnetic | Drawing | Magenta |
| Negatively charged relative to rear electrode | Drawing | Yellow |
| Erasing voltage | Drawing | Gray |
| Positively charged relative to rear electrode, Magnetic | Drawing | Blue |
| Negatively charged relative to rear electrode, Magnetic | Drawing | Green |

It should be understood that the various embodiments shown in the Figures are illustrative representations, and are not necessarily drawn to scale. Reference throughout the specification to "one embodiment" or "an embodiment" or "some embodiments" means that a particular feature, structure, material, or characteristic described in connection with the embodiment(s) is included in at least one embodiment, but not necessarily in all embodiments. Consequently, appearances of the phrases "in one embodiment," "in an embodiment," or "in some embodiments" in various places throughout the Specification are not necessarily referring to the same embodiment.

Unless the context clearly requires otherwise, throughout the disclosure, the words "comprise," "comprising," and the like are to be construed in an inclusive sense as opposed to an exclusive or exhaustive sense; that is to say, in a sense of "including, but not limited to." Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list; all of the items in the list; and any combination of the items in the list.

Having thus described several aspects of at least one embodiment of the technology, it is to be appreciated that various alterations, modifications, and improvements will readily occur to those skilled in the art. Such alterations, modifications, and improvements are intended to be within the spirit and scope of the technology. Accordingly, the foregoing description and drawings provide non-limiting examples only.

The invention claimed is:

1. An electronically-erasable drawing device comprising: an electro-optic display, including:
   an electrophoretic display medium comprising a first set of charged particles having a first polarity, a second set of charged particles having a second polarity opposite of the first polarity, and a third set of magnetic particles that are not charged, wherein the first, second, and third sets of particles are in a fluid, and the first set of charged particles and the second set of charged particles move within the fluid in response to an applied electric field, and the third set of magnetic particles moves within the fluid in response to an applied magnetic field, and the display medium is capable of displaying three extreme optical states and a state intermediate the three extreme optical states,
   interdigitated electrodes disposed adjacent one surface of the electrophoretic display medium and no electrodes disposed on an a drawing surface side of the electrophoretic medium, wherein the drawing surface side is adjacent a second surface of the electrophoretic medium opposite from the interdigitated electrodes, and
   a voltage controller for controlling the potential of the interdigitated electrodes and capable of applying to the interdigitated electrodes voltages such that a fringing field is presented to the electro-optic medium that drives at least a portion of the electro-optic display medium to the state intermediate the three extreme optical states; and
   a stylus including two independently addressable stylus electrodes, wherein the voltage controller is arranged to control an electromagnetic difference between at least one of the interdigitated electrodes and at least one of the stylus electrodes to alter the optical state of a portion of the display medium.

2. The drawing device of claim 1 wherein the voltage controller is arranged to apply voltages of different polarities to different ones of the interdigitated electrodes.

3. The drawing device of claim 1 wherein the voltage controller is arranged to apply an alternating voltage to at least one of the interdigitated electrodes.

4. The drawing device of claim 1 wherein the first set of charged particles, the second set of charged particles, the third set of magnetic particles, and the fluid are confined within a plurality of capsules or microcells, or are present as a plurality of discrete droplets surrounded by a continuous phase comprising a polymeric material.

5. The drawing device of claim 4 wherein a pitch of the interdigitated electrodes is approximately equal to the average repeat distance of the capsules, microcells or plurality of discrete droplets in the same direction.

6. The drawing device of claim 5 wherein the average gap between the interdigitated electrodes is approximately equal to half said average repeat distance.

7. The drawing device of claim 1, comprising a first interdigitated electrode and a second interdigitated electrode, the electrodes being arranged to drive first and second portions of the electro-optic display medium respectively, wherein the voltage controller is arranged to control the first and second interdigitated electrodes independently of one another.

8. The drawing device of claim 1 having a drawing surface on the opposed side of the display medium from said one surface.

9. The drawing device of claim 1 wherein the display medium is a color display medium.

10. The drawing device of claim 1, wherein the stylus is coupled to the voltage controller with a wired connection.

11. The drawing device of claim 1, wherein the stylus is coupled to the voltage controller wirelessly.

12. The drawing device of claim 1, wherein the stylus electrodes are configured to provide fringing fields to alter the optical state of a portion of the display medium.

13. The drawing device of claim 1, wherein the first set of charged particles, the second set of charged particles, and the third set of magnetic particles are differently colored.

14. The drawing device of claim 13, wherein the first set of charged particles is white in color and the second set of charged particles is black in color.

15. The drawing device of claim 14, wherein there are more of the first set of charged particles in the electro-optic medium than of the second set of charged particles.

16. The drawing device of claim 13, wherein the first set of charged particles is white in color, the second set of charged particles is red in color, and the third set of magnetic particles is cyan in color.

* * * * *